US008010403B2

(12) United States Patent
Kala et al.

(10) Patent No.: US 8,010,403 B2
(45) Date of Patent: Aug. 30, 2011

(54) SYSTEM AND METHOD FOR TARGETING TRANSACTION ACCOUNT PRODUCT HOLDERS TO RECEIVE UPGRADED TRANSACTION ACCOUNT PRODUCTS

(75) Inventors: Abhinav Kala, New Delhi (IN); Susana Sung-hye Kim, New York, NY (US); Subhra Shankar Purkayastha, Haryana (IN); Jill Zucker, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 991 days.

(21) Appl. No.: 11/618,329

(22) Filed: Dec. 29, 2006

(65) Prior Publication Data

US 2008/0162258 A1 Jul. 3, 2008

(51) Int. Cl.
G06Q 10/00 (2006.01)
G06Q 30/00 (2006.01)
(52) U.S. Cl. .................................................. 705/7.33
(58) Field of Classification Search ................. 705/7.29, 705/7.33
See application file for complete search history.

(56) References Cited

U.S. PATENT DOCUMENTS

| | | | | |
|---|---|---|---|---|
| 5,201,010 A * | 4/1993 | Deaton et al. | ................. | 382/139 |
| 5,630,073 A * | 5/1997 | Nolan | ............................. | 705/45 |
| 5,842,185 A * | 11/1998 | Chancey et al. | ................ | 705/40 |
| 5,956,693 A * | 9/1999 | Geerlings | .................. | 705/14.53 |
| 6,061,658 A * | 5/2000 | Chou et al. | ....................... | 705/10 |
| 6,226,408 B1 * | 5/2001 | Sirosh | ........................... | 382/224 |
| 6,321,206 B1 * | 11/2001 | Honarvar | ..................... | 705/7.33 |
| 6,430,539 B1 * | 8/2002 | Lazarus et al. | .................. | 705/10 |
| 6,505,168 B1 * | 1/2003 | Rothman et al. | ................. | 705/10 |
| 6,622,126 B1 * | 9/2003 | McArdle et al. | ................ | 705/26 |
| 6,640,215 B1 * | 10/2003 | Galperin et al. | ................ | 706/19 |
| 6,836,773 B2 * | 12/2004 | Tamayo et al. | ....................... | 1/1 |
| 6,839,680 B1 * | 1/2005 | Liu et al. | .......................... | 705/10 |
| 6,839,682 B1 * | 1/2005 | Blume et al. | .................... | 705/10 |

(Continued)

FOREIGN PATENT DOCUMENTS

WO WO 2007/140405 A2 * 12/2007

OTHER PUBLICATIONS

Berry, Alexander III, Using Market Segmentation for Corporate Customers Commercial Lending Review, vol. 10, No. 3, Summer 1995.*

(Continued)

Primary Examiner — Scott L Jarrett
(74) Attorney, Agent, or Firm — Snell & Wilmer L.L.P.

(57) ABSTRACT

Utilization of information in a closed loop data system further augments modeling while at the same time enabling customization of offers based on spend patterns. Data mining techniques are leveraged to identify rules to determine higher response rate populations. These rules are referred to herein as "triggers," in that the presence of particular attributes will trigger a cardholder as being more likely to respond to a particular offer. The benefit yielded by this approach is a greater acceptance rate to an offer provided by a transactional account company. To identify the triggers, records of cardmembers who already utilize a given product are analyzed to determine their spend patterns. The spend histories of customers who are eligible to use the product are analyzed according to the identified triggers. Customers whose spend patterns most closely correspond to the triggers are then targeted with offers for the given product.

11 Claims, 8 Drawing Sheets

U.S. PATENT DOCUMENTS

| | | | |
|---|---|---|---|
| 6,862,574 B1* | 3/2005 | Srikant et al. | 705/10 |
| 6,925,440 B1* | 8/2005 | Shkedi | 705/1.1 |
| 6,925,441 B1* | 8/2005 | Jones et al. | 705/10 |
| 7,296,734 B2* | 11/2007 | Pliha | 235/379 |
| 7,328,169 B2* | 2/2008 | Temares et al. | 705/10 |
| 7,437,330 B1* | 10/2008 | Robinson et al. | 705/67 |
| 7,809,740 B2* | 10/2010 | Chung et al. | 707/758 |
| 2001/0037321 A1* | 11/2001 | Fishman et al. | 705/500 |
| 2002/0194094 A1* | 12/2002 | Lancaster et al. | 705/35 |
| 2002/0194117 A1* | 12/2002 | Nabe et al. | 705/38 |
| 2003/0061132 A1* | 3/2003 | Yu et al. | 705/30 |
| 2003/0130919 A1* | 7/2003 | Templeton et al. | 705/35 |
| 2003/0176931 A1* | 9/2003 | Pednault et al. | 700/31 |
| 2003/0200135 A1* | 10/2003 | Wright | 705/10 |
| 2003/0208468 A1* | 11/2003 | McNab et al. | 707/1 |
| 2003/0212619 A1* | 11/2003 | Jain et al. | 705/35 |
| 2003/0216956 A1* | 11/2003 | Smith et al. | 705/10 |
| 2005/0197954 A1* | 9/2005 | Maitland et al. | 705/39 |
| 2006/0143075 A1* | 6/2006 | Carr et al. | 705/14 |
| 2007/0288299 A1* | 12/2007 | Rane et al. | 705/10 |
| 2008/0086365 A1* | 4/2008 | Zollino et al. | 705/10 |
| 2008/0147425 A1* | 6/2008 | Durvasula et al. | 705/1 |
| 2010/0003675 A1* | 1/2010 | Lund et al. | 435/6 |

OTHER PUBLICATIONS

Black, Joanne, Market segmentation is the key to card profits American Banker, Nov. 8, 1993.*

Francese, Paula A. et al., Finding the Customer American Demographics, vol. 13, No. 1, Jan. 1991.*

Hatch, Denny, You're Pre-Approved! Target Marketing, vol. 20, No. 11, Nov. 1997.*

HNC System Sheds New Light on Cardholder Profile Card News, vol. 13, No. 23, Dec. 7, 1998.*

Lenora, Michael C., Segmenting Credit Cardholders by Behavior Journal of Retail Banking, vol. 13, No. 1, Spring 1991.*

Gary, Angel et al., Using Card Transaction Data American Demographics, vol. 20, No. 8, Aug. 1998.*

Intelligent Miner for Data Applications Guide IBM Redbook, SG24-5252-00, Mar. 1999.*

Bank Card Report: Gold holds its luster American Bankers Association, ABA Banking Journal, vol. 82, No. 3, Mar. 1990.*

Weng, Sung-Shun et al., The Study and Verification of Mathematical Modeling for Customer Purchasing Behavior The Journal of Computer Information Systems, vol. 47, No. 2 Winter 2006.*

Fickenscher, Lisa, Gold cards eyed in push to keep customers American Banker, Nov. 14, 1994.*

Shun, Ruey-Shun et al., Data Mining Applications in Customer Relationship Management of Credit Card Busienss Proceedings of the 29th Annual International Software and Applications Conference, IEEE, 2005.*

Anthes, Gary H., Customer data mining pays off Computerworld, vol. 29, No. 20, May 15, 1995.*

Meltzer, Michael, Using Data Mining on the Road to Successful BI, Part 3 Information Management, Special Reports, Oct. 2004.*

Francese, Paula et al., Finding the customer American Demographics, vol. 13, No. 1, Jan. 1991.*

Reategui, Eliseo B. et al., A Classification System for Credit Card Transactions Proceedings of the Second European Workshop EWCBR-94 (LNCS 984) Haton, 1994.*

* cited by examiner

SYSTEM AND METHOD FOR TARGETING TRANSACTION ACCOUNT PRODUCT HOLDERS TO RECEIVE UPGRADED TRANSACTION ACCOUNT PRODUCTS

BACKGROUND OF THE INVENTION

1. Field of the Invention

This invention is related to marketing, specifically to targeting consumers to improve marketing.

2. Background Art

As the transactional card industry becomes more competitive, the average number of solicitation offers to customers has risen. This has resulted in declining response rates to offers across the industry. The traditional approach to solving the problem rests on econometric modeling. Typically banks offer a customer a product simply based on a particular credit profile using primarily internal credit performance data (for existing customers) or external credit bureau information. What is needed is a system and method for targeting customers that have a demonstrated need, allowing product offers to be made at the appropriate time and improving response rates for the offers.

BRIEF SUMMARY OF THE INVENTION

Utilization of information in a closed loop data system further augments modeling while at the same time enabling customization of offers based on spend patterns. Data mining techniques are leveraged to identify rules to determine higher response rate populations. These rules are referred to herein as "triggers," in that the presence of particular attributes will trigger a cardholder as being more likely to respond to a particular offer. The benefit yielded by this approach is a greater acceptance rate to an offer provided by a transactional account company.

To identify the triggers, records of cardmembers who already utilize a given product are analyzed to determine their spend patterns. The spend histories of customers who are eligible to use the product are analyzed according to the identified triggers. Customers whose spend patterns most closely correspond to the triggers are then targeted with offers for the given product.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

I. Overview

Figure 1:
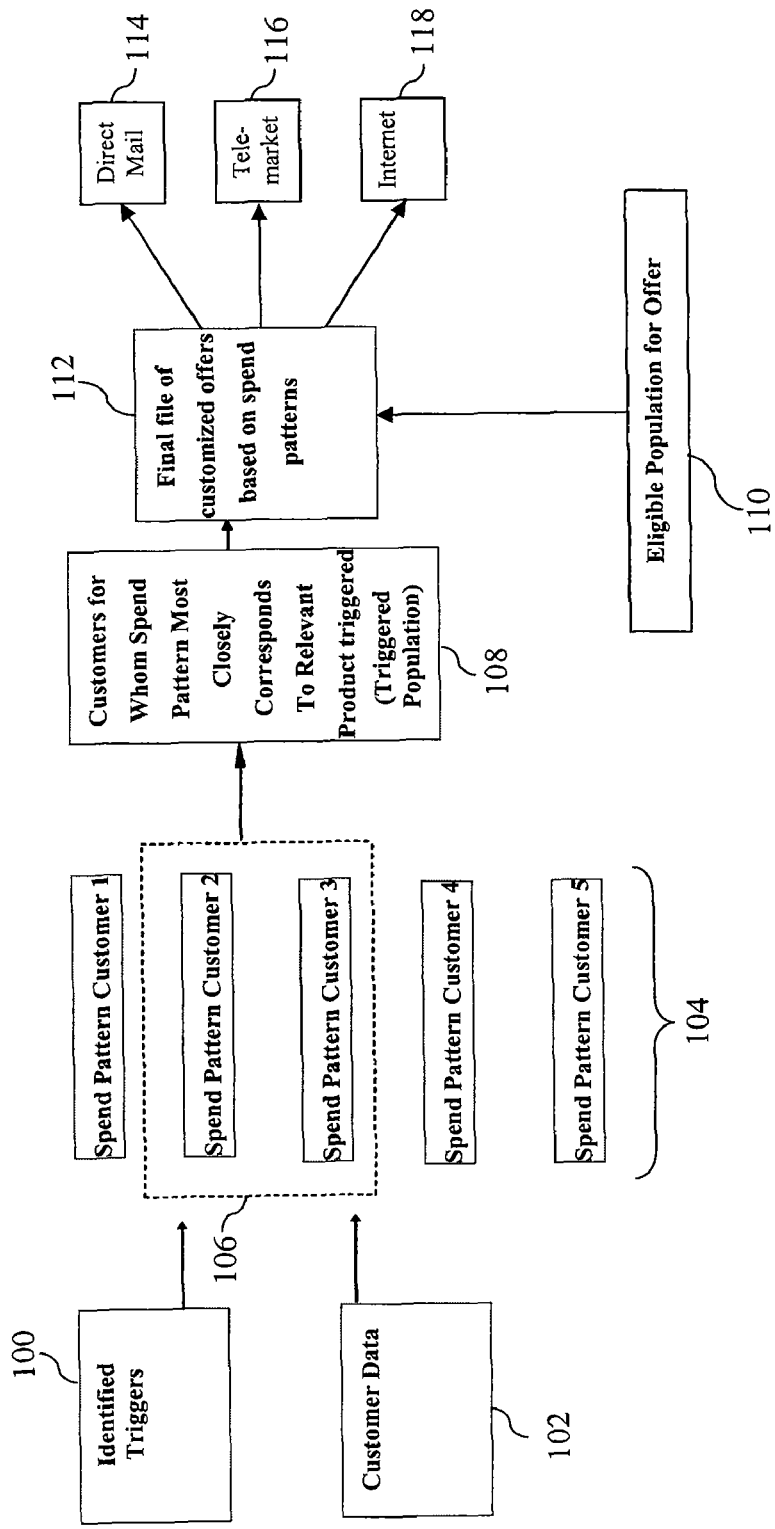
FIG. 1 is a block diagram for implementing a product targeting method.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

The terms "user," "end user," "consumer," "customer," "participant," and/or the plural form of these terms are used interchangeably throughout herein to refer to those persons or entities capable of accessing, using, being affected by and/or benefiting from the tool that the present invention provides for improving customer marketing.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

1. Transaction Accounts and Instrument

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader. The primary transaction instrument associated with a transaction account is typically referred to as a "basic" instrument, while additional instruments corresponding to the same account are typically referred to as "supplementary" instruments.

2. Open Versus Closed Cards

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gape store.

3. Stored Value Cards

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments together totaling no more than ten dollars.

4. Use of Transaction Accounts

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

II. Customizing Offers

Collaborative filtering is the process of computing personalized recommendations by finding users with similar tastes. When the product is a transactional card, cardmember shopping/spend data can be used to derive product affinity among cardmembers with similar shopping/spend behaviors so that cardmembers having the highest product affinity can be targeted with offers for that product. For example, cardmembers shopping at merchants with high conversion rates for a given product will be more likely to respond to an offer for that product.

A customer spend model can be developed using spend records of customers who converted to a different product (e.g., upgraded to a higher status transaction card). The spend records are analyzed to identify patterns of spending behavior that are common across a number of cardmembers. A "trigger" is identified based on those patterns. For example, if a high number of customers of a retail establishment convert to the product within a few months after shopping at the retail establishment, purchases made at that retail establishment will be identified as a trigger.

FIG. 1 is a block diagram illustrating how an exemplary product targeting method is implemented. As shown in FIG. 1, triggers 100 for a particular financial product are identified. The financial product may be, for example and without limitation, a high status card, a card with a special rewards program (such as a card linked to an education savings account), or a card with special benefits (such as reduced-fee cards for family members). Triggers 100 may be determined based on the spend patterns of customers who have recently converted to the particular financial product. To determine triggers for transactional cards, for example, the affinity level for users of a given card product (such as an American Express® Blue card or an American Express® Platinum card) to a given merchant can be identified. Additionally, the records of those who recently converted to the given card product can be analyzed to determine a product conversion rate for customers shopping at the given merchant. Purchases made at the merchant are thus triggers for the given card product. Such a process for determining triggers will be described in further detail with respect to FIG. 2.

Additionally, customer data 102 is analyzed to determine spend patterns 104 of potential converters to the particular financial card product. Spend patterns 104 of potential converters are analyzed with respect to triggers 100 to identify consumers 106 who have spend patterns that most closely match triggers 100. Since the spend patterns of triggered population 106 are similar to recent converters, it is likely that consumers 106 would also be interested in the product. Consumers 106 are thus included in a triggered population 108. Triggered population 108 is compared to a list 110 of the population eligible to receive an offer for the product. Members of triggered population 108 who are eligible for the product offer are input into a final list of consumers 112 who should be targeted with offers related to the product. Consumers 112 are then targeted with offers to convert to the financial product via, for example and without limitation, direct mail 114, telemarketing calls 116, and/or Internet notices 118. Identifying in this manner the consumers who are most likely in need of the new financial product results in a higher response rate than with targeting methods previously used.

One example of an offer that may be extended to eligible customers is an offer for a higher status transaction card. An individual may already have a regular transaction card (e.g., American Express® Blue) with a transaction account company. However, the transaction account company may offer a higher status card (e.g, American Express® Platinum) that has a higher cost but offers more perks to the card holder. Such a higher status card will be referred to herein as an "elite card," while the lower status card will be referred to herein as a "regular card." Upgrade offers are used to encourage regular card holders to switch to elite card products. Targeting upgrade offers only to those regular card holders having a high likelihood of response results in reduced cost to the transaction card company.

Another example of an offer that may be extended to eligible customers is an offer for supplemental cards linked to existing transaction accounts. An individual may already have a transaction card with a transaction account company. However, other people (e.g., family members) use the individual's card on a regular basis. Targeting individuals who share their card with others with an offer to add a supplemental card to their account also results in a higher likelihood of response and reduced cost to the transaction card company.

Figure 2:
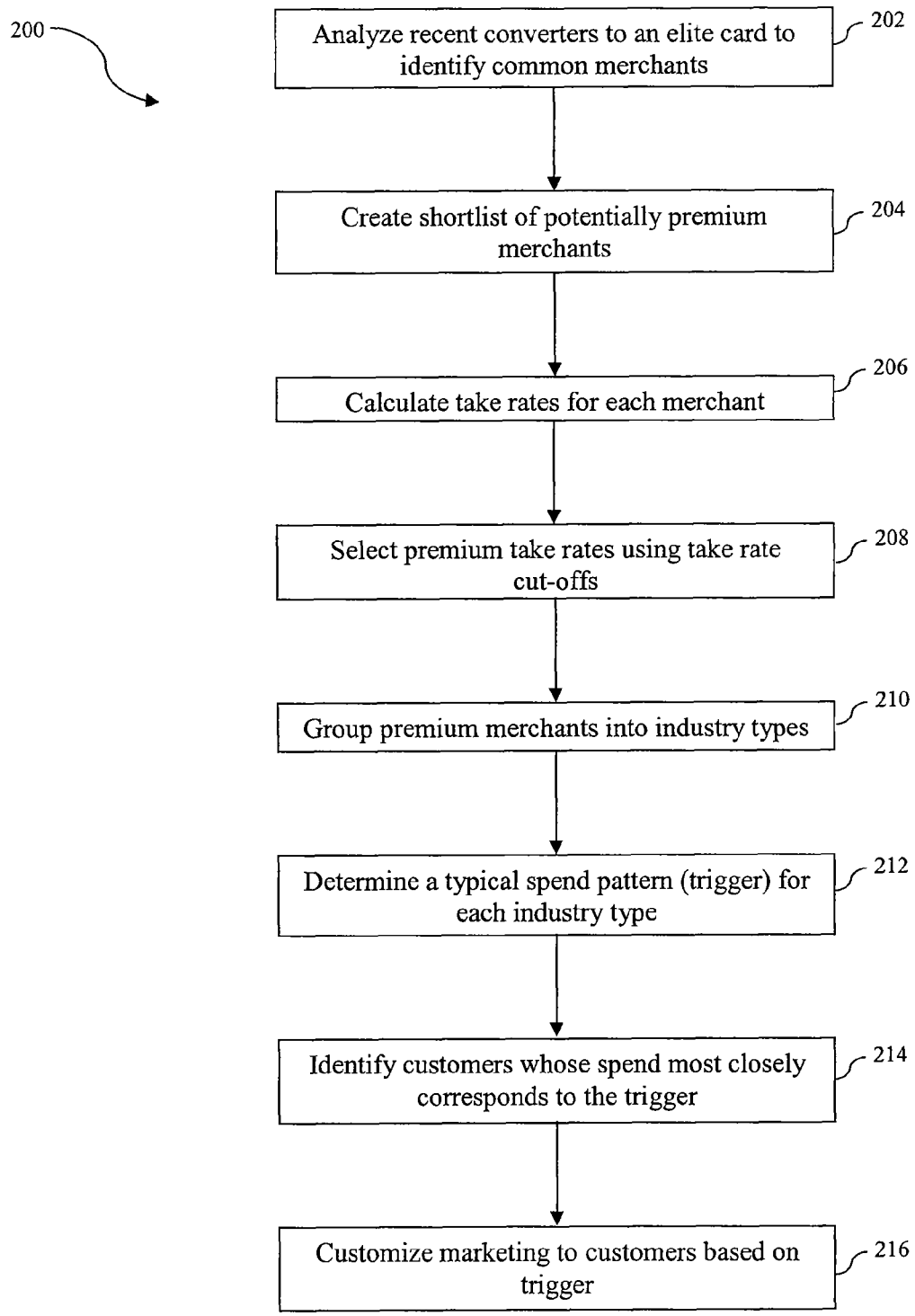
FIG. 2 is a flowchart of an example method for targeting customers for an elite card upgrade.
Figure 7:
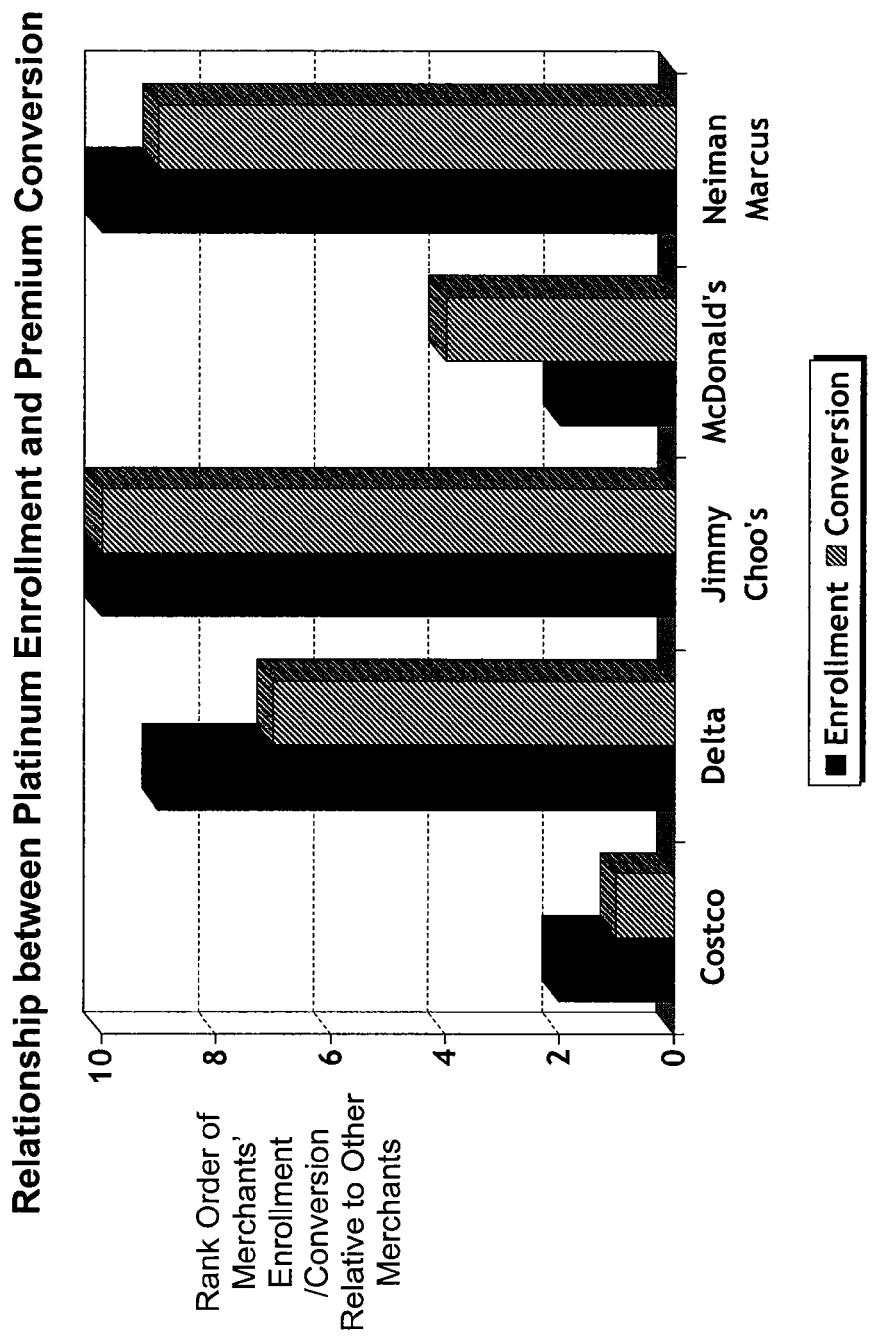
FIG. 7 is a chart illustrating the correlation between existing elite card enrollment and a rate of conversion to an elite card.

FIG. 2 illustrates an example method 200 for targeting customers for a given card product (such as an elite card upgrade or a supplemental card for an existing transaction card account). As illustrated in FIG. 7, there is a high correlation between purchases made by existing cardholders and consumers who convert to a given card product, so the conversion rates of particular merchants can be used to determine product affinity within industry categories. So, returning to FIG. 2, in step 202 the records of recent converters to the given card product are analyzed to identify merchants that are commonly visited by the converters. Supplemental card spend may also be analyzed.

In step 204, a shortlist of potentially premium merchants is created. This shortlist may include, for example, merchants associated with a high percentage of converters to the given card product.

In step 206, this shortlist is analyzed to determine the volume of total transactors (e.g., customers making purchases) for each merchant that convert to the given card in a given time period (e.g., three months) following the transaction. A "take rate" is calculated based on this analysis. The take rate is the percentage of offerees who actually accept a product offer.

In step 208, premium merchants for the card product are selected using various take rate cut-offs.

In step 210, the premium merchants are grouped into most viable industry types based on the value proposition of the card product. For example, consumers purchasing in the fine dining industry are more likely to convert to an elite card, while consumers purchasing in the fast food industry are more likely to accept an offer for a regular card. Similarly, consumers purchasing in the women's clothing industry and the club/resort industry are more likely to convert to an elite card, while consumers purchasing in the supermarket industry are more likely to accept an offer for a regular card. Viable industry types for an elite card indicator thus include the fine dining, women's clothing, and club/resort industries, while viable industry types for a regular card indicator include the fast food and supermarket industries.

In step 212, for each viable industry type, different thresholds and frequencies for spend of recent converters are analyzed to determine a typical spend pattern (the trigger) for converters to the card product. Various triggers will now be discussed.

One type of elite card upgrade trigger targets individuals based on their retail transactions. One example retail trigger is a niche retail trigger. The niche retail trigger identifies individuals who make a purchase above a given amount (e.g., $500) at select jewelry stores, art dealers, antique stores, etc., such as Bulgari S.p.A, headquartered in Rome, Italy; Tiffany & Co., headquartered in New York, N.Y.; or Park West Gallery, headquartered in Southfield, Mich. As previously mentioned, a take rate is the percentage of individuals who accepted a card upgrade offer within a given time (e.g., three months) after making a particular transaction. An example take rate for transactors at niche retailers is approximately 1.17%. Another example retail trigger is a high end retail trigger. The high end retail trigger identifies individuals who visit select high end boutiques, such as Neiman Marcus, Inc., headquartered in Dallas, Tex.; Louis Vuitton SA, headquartered in Paris, France; LaCoste, headquartered in Paris, France; or Brooks Brothers, headquartered in New York, N.Y., more than once in a given time period (e.g., one month). An example take rate for transactors at high end retailers is approximately 1.03%.

Another type of elite card upgrade trigger targets individuals based on their leisure activities. An example leisure activity trigger is a golf/ski/spa trigger. This trigger identifies individuals who are involved in luxury sports and leisure that are often associated with the affluent. An example take rate for such transactors is approximately 0.99%. Another example leisure activity trigger is a fine dining trigger. The fine dining trigger identifies individuals who visit select fine restaurants, such as Ruth's Chris Steak House, Inc., headquartered in Heathrow, Fla.; or The French Gourmet of San Diego, Calif. An example take rate for transactors at fine restaurants is approximately 0.89%.

Travel and high value record of charge ("ROC") triggers are other types of elite card upgrade triggers. An example travel trigger is a luxury travel and stay trigger. The luxury travel and stay trigger identifies individuals who travel first class on airlines, travel on cruises, and/or stay at select fine hotels, such as hotels by Marriott International, Inc. of Bethesda, Md. An example take rate for transactors who spend on luxury travel and stay is approximately 1.21%. Another example travel trigger is a frequent travel trigger. The frequent travel trigger targets individuals who fly a certain number of times in a given time period (e.g., more than two flights in a month). An example take rate for transactors who frequently spend on travel is approximately 0.69%. A high value ROC trigger identifies individuals who make purchases greater than a given amount at any location (e.g., greater than $1000). This trigger targets people who may not be included in other triggers, but who appear to be affluent based on the amount of their purchases. An example take rate for high value ROC transactors is approximately 0.66%.

Targeting individuals in these example categories allows a transactional card company to increase the number of individuals eligible for an elite upgrade offer, while maintaining a high take rate for the upgrade.

Figure 8:
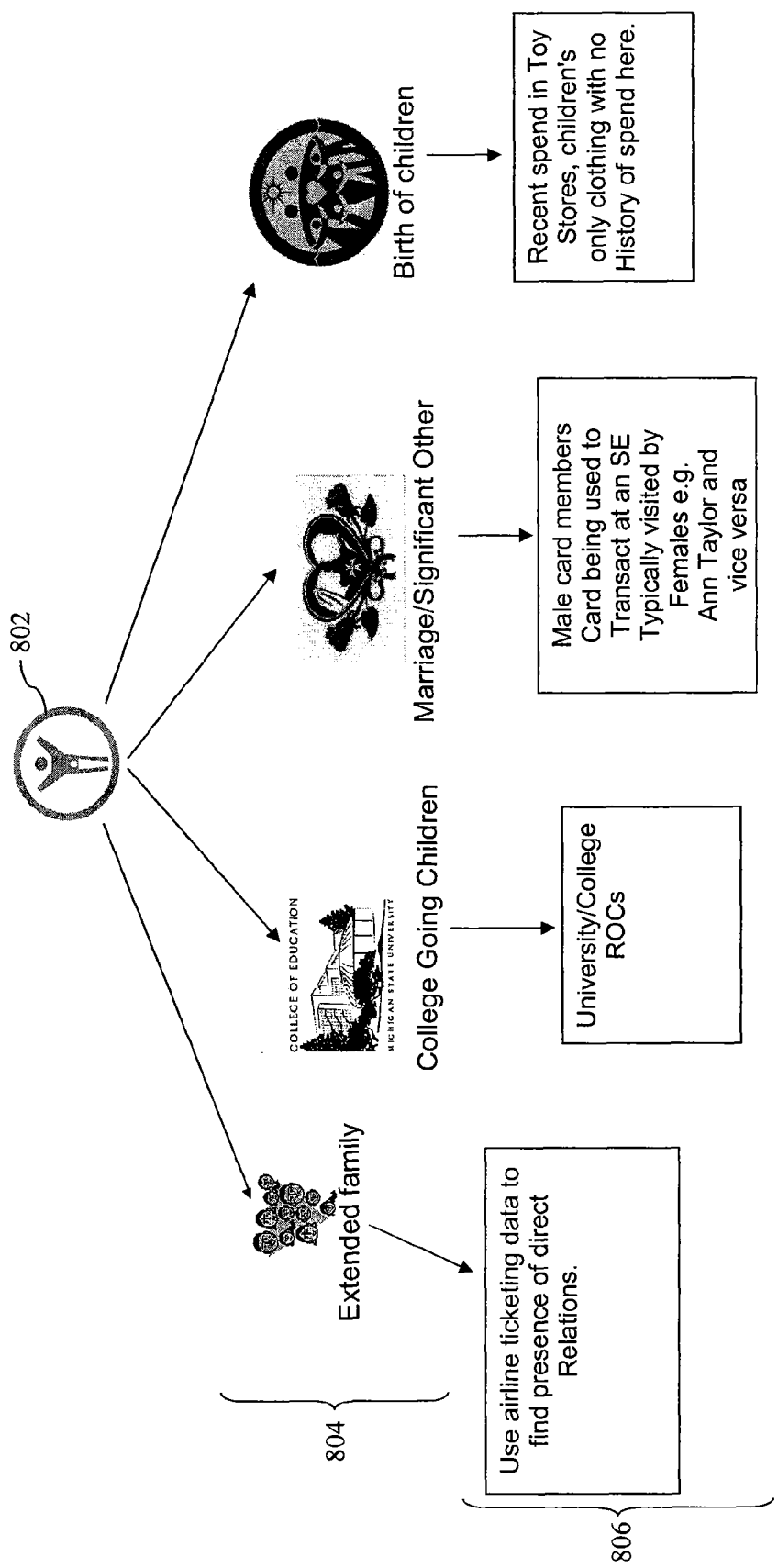
FIG. 8 is a diagram illustrating exemplary triggers for various life events.

In addition to the triggers that target cardmembers in need of a product upgrade, "life event" triggers indicate that a cardmember may be in need of a new or supplementary card product to meet new needs resulting from the life event. Spend patterns of the eligible population may be compared to their historical spend patterns to identify changes in spend patterns (the triggers), and to estimate what life event is most possibly associated with the pattern. The life event triggers indicate not only a higher need for the new or supplementary card product so as to target a higher response rate population, but also enables more customized product targeting based on the life event most closely captured by the spend pattern change. FIG. 8 is a diagram illustrating exemplary triggers for several life events. A basic cardmember 802 may undergo one or more life events 804. Example life events include, for example and without limitation, the presence of extended family, a recent marriage or significant other, the birth of a child, and a child going off to college. Each of life events 804 can be identified by a trigger 806. That is, each life even 804 can be associated with a corresponding change in spend pattern by cardmember 802. Each of life events 804 will now be discussed in turn.

Detecting the presence of extended family assumes that when the analysis begins, some people already have a family, and so their spend pattern is already set to include the family. Therefore, there are not any significant and/or sudden changes in spend pattern. This trigger matches card member last names and first names to the name information obtained from, for example, airline ticketing information. Any tickets purchased for a passenger using an existing cardmember's transaction card, wherein the passenger has the same last name as the cardmember but a different first name, indicates presence of close relatives such as parents and siblings. Since other people utilize the cardmember's account, the cardmember is likely to benefit from a supplementary card and is thus targeted for a supplementary card offer. An example overall take rate for supplementary card offers to cardmembers with extended family is approximately 0.80%, with an example take rate for supplementary charge cards being approximately 0.83% and an example take rate for supplementary lending cards being approximately 0.75%.

Cardmembers who have college or education ROCs likely have children going to college. These cardmembers may be in need of a supplementary card for those children, and can be targeted accordingly. An example overall take rate for supplementary card offers to cardmembers with children attending college is 0.95%, with an example take rate for charge cards being 1.08% and an example take rate for lending cards being 0.83%.

Additions to households in the form of marriage or children show up in the form of current spend deviations from historical spend, and in the form of shift in spend pattern towards purchases typical of people with families and companions. For instance, the presence of a recent marriage or significant other can be determined in various ways.

In a first example, the records of all merchants are reviewed, and for each merchant the total number of male and female cardmembers making transactions at the merchant in a given period of time is calculated. Each merchant is then given a ratio for (female customers/total customers) transacting and (male customers/total customers) transacting at the merchant. Merchants who have more than 80% of transactions being made by one gender are identified as skewed merchants. Then, a cardmember whose card is used to make a transaction at a merchant skewed towards the opposite gender is identified as a possible supplementary card taker. That is, if a card belonging to a male cardmember is used to make a transaction at a merchant that caters to females, then there is a high probability that the card is being used by the cardmember's girlfriend or spouse. This identifies a possible need by the cardmember for a supplementary card, and targeted offers for a supplementary card can be made to that cardmember. An example overall take rate for supplementary card offers to cardmembers who are married or have a significant other is approximately 1.39%, with an example take rate for charge cards being approximately 1.48% and an example take rate for lending cards being approximately 1.27%.

In a second example, airline ticketing data is analyzed to identify same card purchases for travel on the same date and issued together to the same locations. Such attributes indicate companion ticketing. Then, looking at merchants that can be clubbed into timeshare, resorts, and travel agents categories and using the take rate criterion utilized for the elite card upgrade triggers, a list of merchants having travel packages geared towards couples and/or family can be created. Individuals who shop at those merchants likely have spouses or significant others, and may thus be in need of a supplementary card. An example overall take rate for supplementary card offers to individuals who spend on companion ticketing and/or timeshare packages is approximately 1.12%, with an example take rate for charge cards being approximately 1.16% and an example take rate for lending cards being approximately 1.06%.

Additional indicators of family are determined by first looking at merchants that have a high probability of being visited by existing supplementary cardmembers. These primarily occupy categories such as home improvement and entertainment. Spend and count thresholds for spend at these categories are used to come up with a typical spend pattern for the higher take rate population. Then, time series data is reviewed to come up with indicators for additions to the family in the form of, for example, birth of a child. For this example, the historical spend (e.g., spend over the previous six months) is compared to spend in the current month at toy stores and children's-only clothing stores. If the ratio is a significant value (e.g., if the current month shows three or more times the amount of purchases as in previous months) then it indicates with a high probability the presence of a newborn. The ratio requirement takes care of the scenario where an individual has made minor purchases in the past for a friend or relative's child. Time series data can also be used to compare the everyday spend amount (spend in grocery stores, department stores, and other types of spend that are regular purchases) in the current month to spend in the previous months. If the pattern of spend in the current month is significantly different (in that it is substantially higher), which is determined using a statistically derived cutoff, it can be inferred that the card member now has a family or an addition to the family.

Other indicators of family include consistent spend at family restaurants and family clothing stores (e.g., making purchases in these categories at least twice in a month), significant spend on home improvements (e.g., more than $300 a month), and consistent spend on entertainment such as cinema and operas (e.g., at least once per month). An example take rate for supplementary card offers to cardmembers having additions to the family is approximately 0.95%, with an example take rate for charge cards being approximately 0.98% and an example take rate for lending cards being approximately 0.92%.

Figure 3:
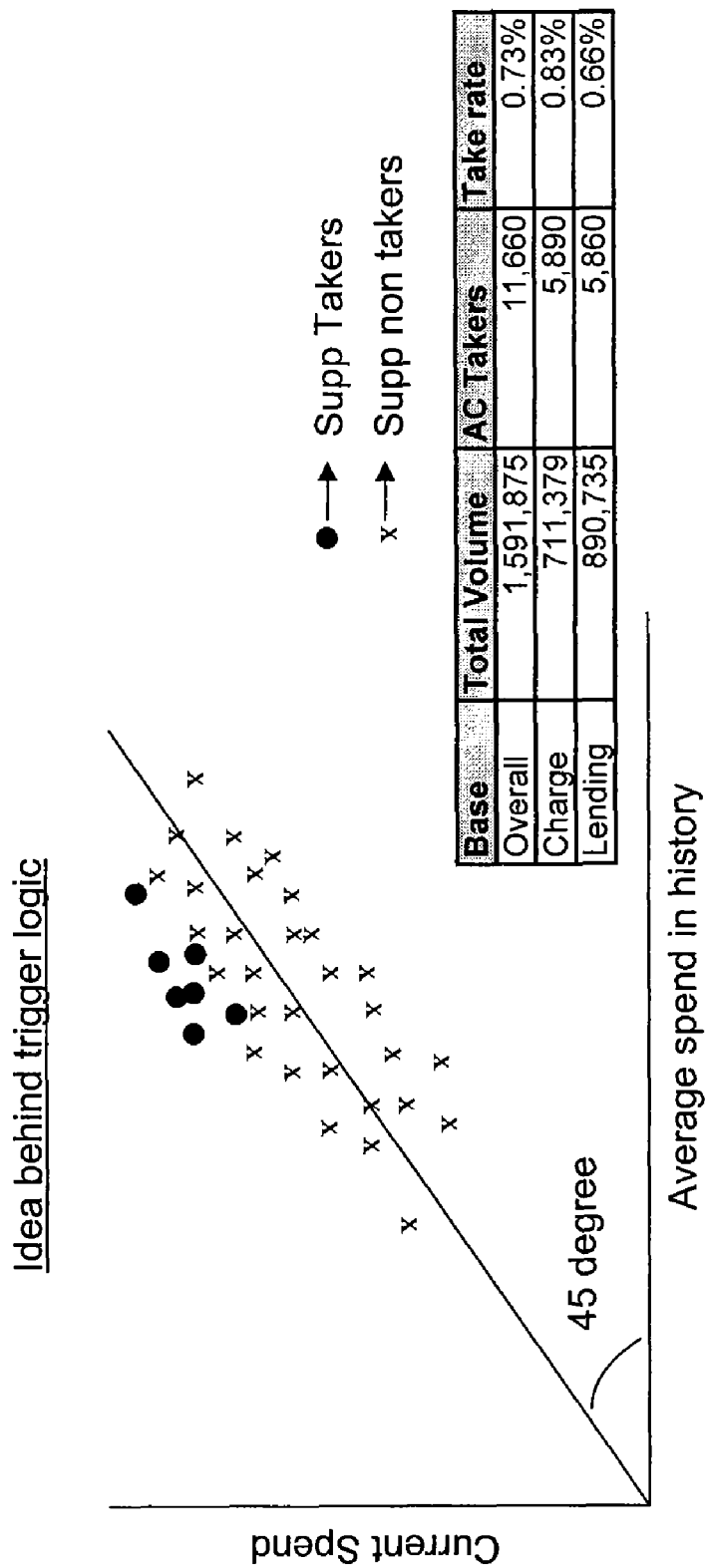
FIG. 3 is a chart illustrating the logic behind life event triggers.

FIG. 3 is a chart detailing the logic behind the triggers for life event indicators. FIG. 3 plots the cardmember's current spend against the average spend in the cardmember's history. Cardmembers who accepted a supplementary card offer are distinguished from cardmembers who did not accept a supplementary card offer. As shown, supplementary card takers have a higher deviation in current spend compared to their historical average than non-takers. This can be used to identify thresholds for determining when a life event occurs for a cardmember. For example, a life event threshold may be set to trigger when the cardmember's current every day spend ("EDS") is greater than the cardmember's average spend in the last six months, added to two times the standard deviation. Similarly, a life event threshold indicating an addition to the family may be set to trigger when the cardmember's spend on insurance in the current month is greater than two times the cardmember's average spend on insurance in the previous six months.

Other information besides the occurrence of a life event can also be used to trigger cardmembers in need of additional card products. Non-ROC information can be used to target members of the residual population of cardmembers who are likely in need of a supplementary card. For example, new cardmembers or cardmembers who recently changed their address may be responsive to a supplementary card offer. An example overall take rate for supplementary card offers to these residual cardmembers is approximately 0.88%, with an example take rate for charge cards being approximately 1.13% and an example take rate for lending cards being approximately 0.77%.

Figure 4B:
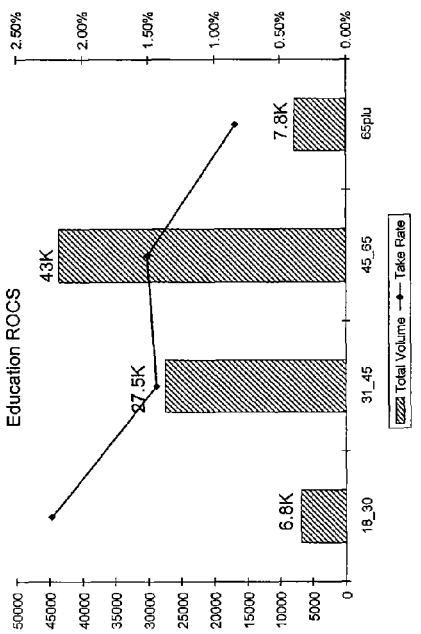
FIG. 4B illustrates the supplementary charge card take rate for various age ranges for an exemplary education records of charge trigger.
Figure 4D:
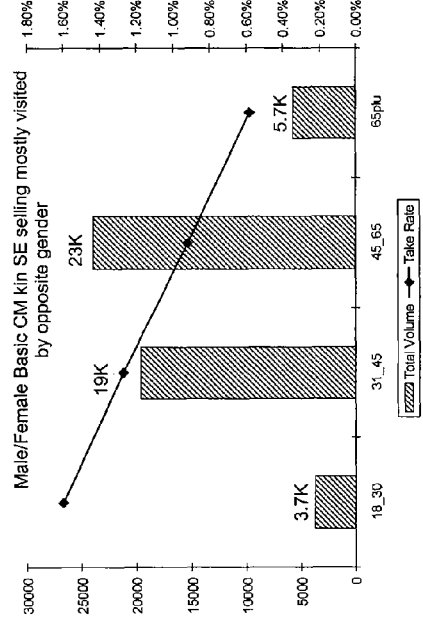
FIG. 4D illustrates the supplementary charge card take rate for various age ranges for an exemplary opposite gender sale trigger.
Figure 4A:
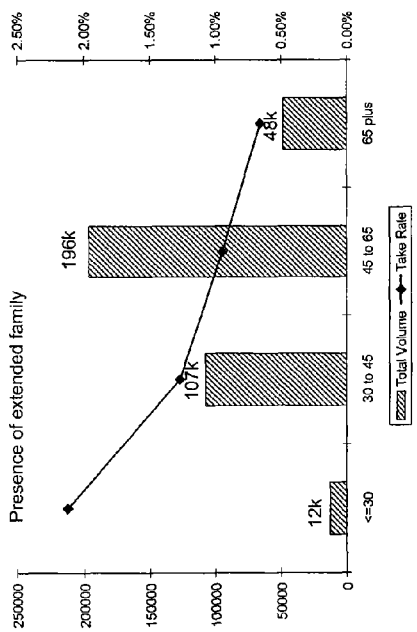
FIG. 4A illustrates the supplementary charge card take rate for various age ranges for an exemplary presence of extended family trigger.
Figure 4C:
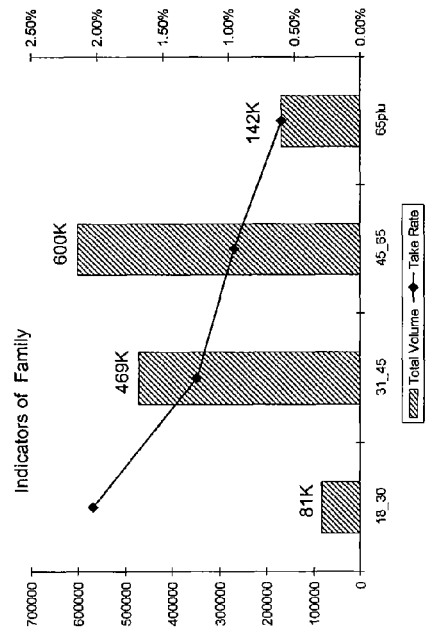
FIG. 4C illustrates the supplementary charge card take rate for various age ranges for an exemplary indicators of family trigger.

The age of the cardmember is also a factor in the take rate of supplementary charge card offers. FIGS. 4A through 4D are charts showing the supplementary charge card take rate for various age ranges in each of the trigger categories. In each chart, the age range is listed on the horizontal axis. The left vertical axis indicates the total spend volume using charge cards, while the right vertical axis indicates the charge card take rate. FIG. 4A illustrates the volumes and take rates for the extended family trigger. FIG. 4B illustrates the volumes and take rates for the education ROC trigger. FIG. 4C illustrates the volumes and take rates for the family indicator trigger, and FIG. 4D illustrates the volumes and take rates for the spend by opposite gender trigger.

Figure 5B:
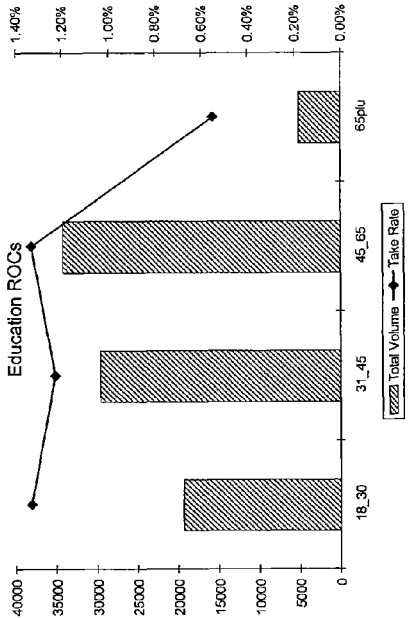
FIG. 5B illustrates the supplementary lending card take rate for various age ranges for an exemplary education records of charge trigger.
Figure 5D:
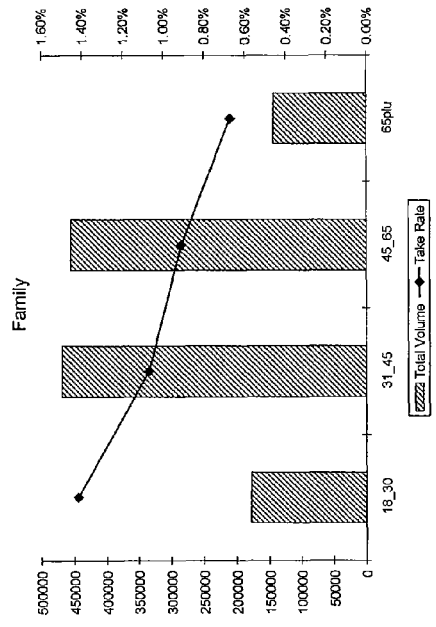
FIG. 5D illustrates the supplementary lending card take rate for various age ranges for an exemplary indicators of family trigger.
Figure 5A:
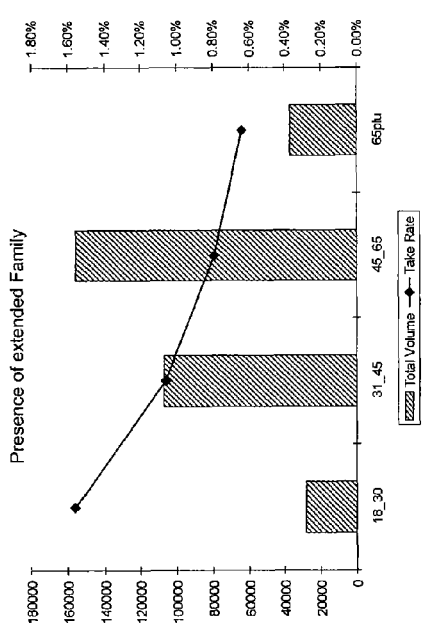
FIG. 5A illustrates the supplementary lending card take rate for various age ranges for an exemplary presence of extended family trigger.
Figure 5C:
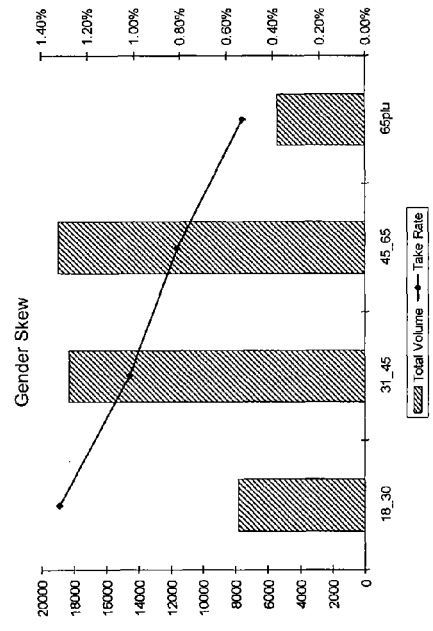
FIG. 5C illustrates the supplementary lending card take rate for various age ranges for an exemplary opposite gender sale trigger.

Similarly, the age of the cardmember is a factor in the take rate of supplementary lending card offers. FIGS. 5A through 5D are charts showing the supplementary lending card take rate for various age ranges in each of the trigger categories. In each chart, the age range is listed on the horizontal axis. The left vertical axis indicates the total spend volume using lending cards, while the right vertical axis indicates the lending card take rate. FIG. 5A illustrates the volumes and take rates for the extended family trigger. FIG. 5B illustrates the volumes and take rates for the education ROC trigger. FIG. 5C illustrates the volumes and take rates for the family indicator trigger, and FIG. 5D illustrates the volumes and take rates for the spend by opposite gender trigger.

Returning to FIG. 2, after the triggers are identified in step 212, method 200 proceeds to step 214. In step 214, potential converters whose spend patterns most closely conform to the trigger are identified.

In step 216, customized marketing is created to target the potential converters based on the trigger.

III. Example Implementations

The present invention may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 6:
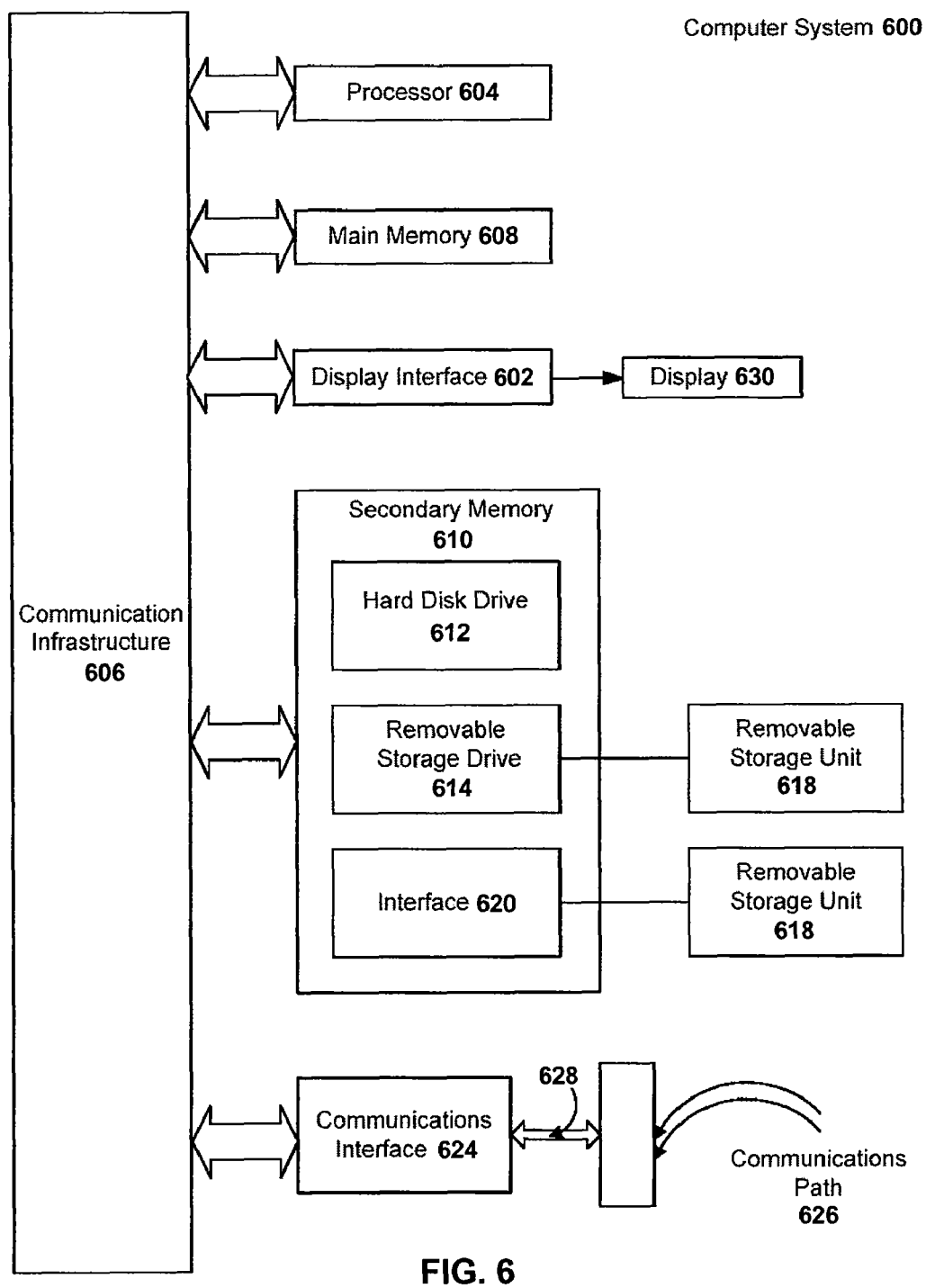
FIG. 6 is a block diagram of an exemplary computer system useful for implementing the present invention.

In fact, in one embodiment, the invention is directed toward one or more computer systems capable of carrying out the functionality described herein. An example of a computer system 600 is shown in FIG. 6.

The computer system 600 includes one or more processors, such as processor 604. The processor 604 is connected to a communication infrastructure 606 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 600 can include a display interface 602 that forwards graphics, text, and other data from the communication infrastructure 606 (or from a frame buffer not shown) for display on the display unit 630.

Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618 represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar devices for allowing computer programs or other instructions to be loaded into computer system 600. Such devices may include, for example, a removable storage unit 618 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 618 and interfaces 620, which allow software and data to be transferred from the removable storage unit 618 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628 which may be electronic, electromagnetic, optical or other signals capable of being received by communications interface 624. These signals 628 are provided to communications interface 624 via a communications path (e.g., channel) 626. This channel 626 carries signals 628 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 614, a hard disk installed in hard disk drive 612, and signals 628. These computer program products provide software to computer system 600. The invention is directed to such computer program products.

Computer programs (also referred to as computer control logic) are stored in main memory 608 and/or secondary memory 610. Computer programs may also be received via communications interface 624. Such computer programs, when executed, enable the computer system 600 to perform the features of the present invention, as discussed herein. In particular, the computer programs, when executed, enable the processor 604 to perform the features of the present invention. Accordingly, such computer programs represent controllers of the computer system 600.

In an embodiment where the invention is implemented using software, the software may be stored in a computer program product and loaded into computer system 600 using removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

IV. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method comprising:
   identifying, by a computer-based system for targeted marketing, a merchant that is commonly visited by customers who have converted to an upgraded transaction account product based upon a number of transaction accounts that are upgraded after being used to make a purchase at the merchant;
   determining, by the computer-based system, that the merchant is a potential premium merchant;
   identifying, by the computer-based system, an industry group associated with the potential premium merchant;
   grouping, by the computer-based system, the potential premium merchant into a group of potential premium merchants based on a value proposition associated with each potential premium merchant;
   identifying, by the computer-based system, a plurality of transaction account holders having a typical pattern of spending within the industry group of the potential premium merchant by analyzing spend records of the plurality of transaction account holders, wherein a typical pattern of spending comprises a spending pattern that is shared by the plurality of transaction account holders;
   identifying, by the computer-based system, a potential converter who shares a spending pattern in common with the typical pattern of spending within the industry group and the potential premium merchant group; and
   targeting, by the computer-based system, marketing about the upgraded transaction account product to the potential converter.

2. The method of claim 1, wherein the customers who have converted to an upgraded transaction account product have done so within an interval of three months.

3. The method of claim 1, wherein the industry group is at least one of: niche retail, high-end retail, fine dining, luxury travel, and leisure.

4. The method of claim 1, wherein the upgraded transaction account product is an elite transaction account product.

5. The method of claim 1, further comprising calculating, by the computer-based system, a take rate for each potential premium merchant.

6. The method of claim 1, further comprising grouping, by the computer-based system, a plurality of potential converters into an industry group.

7. The method of claim 6, wherein the industry group is at least one of: niche retail, high-end retail, fine dining, luxury travel, and leisure.

8. The method of claim 6, further comprising identifying, by the computer-based system, an affinity of customers for the industry group.

9. The method of claim 6, further comprising deriving, by the computer-based system, a conversion rate of transaction accounts in the industry group.

10. An article of manufacture including a non-transitory, tangible computer readable medium having instructions stored thereon for targeted marketing that, in response to execution by a computer-based system, cause the computer-based system to perform operations comprising:
    identifying, by a computer-based system for targeted marketing, a merchant that is commonly visited by customers who have converted to an upgraded transaction account product based upon a number of transaction accounts that are upgraded after being used to make a purchase at the merchant;
    determining, by the computer-based system, that the merchant is a potential premium merchant;
    identifying, by the computer-based system, an industry group associated with the potential premium merchant;
    grouping, by the computer-based system, the potential premium merchant into a group of potential premium merchants based on a value proposition associated with each potential premium merchant;
    identifying, by the computer-based system, a plurality of transaction account holders having a typical pattern of spending within the industry group of the potential premium merchant by analyzing spend records of the plurality of transaction account holders, wherein a typical pattern of spending comprises a spending pattern that is shared by the plurality of transaction account holders;
    identifying, by the computer-based system, a potential converter who shares a spending pattern in common with the typical pattern of spending within the industry group and the potential premium merchant group; and
    targeting, by the computer-based system, marketing about the upgraded transaction account product to the potential converter.

11. A system comprising:
    a tangible, non-transitory memory communicating with a processor, the tangible, non-transitory memory having instructions stored thereon for targeted marketing that, in response to execution by the processor, cause the processor to perform operations comprising:

identifying, by a computer-based system for targeted marketing, a merchant that is commonly visited by customers who have converted to an upgraded transaction account product based upon a number of transaction accounts that are upgraded after being used to make a purchase at the merchant;

determining, by the computer-based system, that the merchant is a potential premium merchant;

identifying, by the computer-based system, an industry group associated with the potential premium merchant;

grouping, by the computer-based system, the potential premium merchant into a group of potential premium merchants based on a value proposition associated with each potential premium merchant;

identifying, by the computer-based system, a plurality of transaction account holders having a typical pattern of spending within the industry group of the potential premium merchant by analyzing spend records of the plurality of transaction account holders, wherein a typical pattern of spending comprises a spending pattern that is shared by the plurality of transaction account holders;

identifying, by the computer-based system, a potential converter who shares a spending pattern in common with the typical pattern of spending within the industry group and the potential premium merchant group; and targeting, by the computer-based system, marketing about the upgraded transaction account product to the potential converter.

* * * * *